US 9,751,412 B2

(12) United States Patent
Im

(10) Patent No.: US 9,751,412 B2
(45) Date of Patent: Sep. 5, 2017

(54) CABLE INSTALLMENT TYPE CHARGING CONTROL DEVICE AND METHOD OF OPERATING THE SAME

(71) Applicant: LSIS CO., LTD., Anyang-si, Gyeonggi-do (KR)

(72) Inventor: Chang Jun Im, Asan-si (KR)

(73) Assignee: LSIS CO., LTD., Anyang-si (KR)

( * ) Notice: Subject to any disclaimer, the term of this patent is extended or adjusted under 35 U.S.C. 154(b) by 220 days.

(21) Appl. No.: 14/660,737

(22) Filed: Mar. 17, 2015

(65) Prior Publication Data
US 2015/0266388 A1 Sep. 24, 2015

(30) Foreign Application Priority Data
Mar. 19, 2014 (KR) ........................ 10-2014-0032240

(51) Int. Cl.
*H02J 7/00* (2006.01)
*B60L 11/18* (2006.01)
(Continued)

(52) U.S. Cl.
CPC ......... *B60L 11/1816* (2013.01); *B60L 3/0069* (2013.01); *B60L 3/04* (2013.01);
(Continued)

(58) Field of Classification Search
CPC .............. B60L 11/1816; B60L 11/1818; B60L 11/1846; B60L 2230/12; B60L 2230/16;
(Continued)

(56) References Cited

U.S. PATENT DOCUMENTS 7,459,910 B2 * 12/2008 Kawamura .......... H01H 47/002
307/39
8,541,978 B2 * 9/2013 Fukuo ................... B60L 3/0069
320/109
(Continued)

FOREIGN PATENT DOCUMENTS

| CN | 202798008 | * | 3/2013 |
|---|---|---|---|
| CN | 103516034 | | 1/2014 |

(Continued)

OTHER PUBLICATIONS

Machine English Translation of JP2000173428, 6 pages.*
(Continued)

*Primary Examiner* — Nathaniel Pelton
(74) *Attorney, Agent, or Firm* — Lee, Hong, Degerman, Kang & Waimey PC

(57) ABSTRACT

A cable installment type charging control device for charging an electric vehicle (EV) by using power of a grid-side is provided. The cable installment type charging control device includes a first relay delivering power of the grid-side to an EV-side, a second relay delivering power of the grid-side to the EV-side, a first sub fusion detecting unit for detecting whether the first relay is fused through an-EV side terminal of the first relay and a grid-side terminal of the second relay, and a second sub fusion detecting unit for detecting whether the second relay is fused through an-EV side terminal of the second relay and a grid-side terminal of the first relay.

7 Claims, 12 Drawing Sheets

(51) Int. Cl.
  *B60L 3/00* (2006.01)
  *B60L 3/04* (2006.01)
(52) U.S. Cl.
  CPC ....... *B60L 11/1818* (2013.01); *B60L 11/1846* (2013.01); *H02J 7/007* (2013.01); *H02J 7/0047* (2013.01); *B60L 2210/30* (2013.01); *B60L 2230/12* (2013.01); *B60L 2230/16* (2013.01); *B60L 2240/36* (2013.01); *B60L 2240/667* (2013.01); *B60L 2240/70* (2013.01); *Y02T 10/7005* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)
(58) Field of Classification Search
  CPC .... B60L 2210/30; B60L 3/04; B60L 2240/36; B60L 2240/667; B60L 2240/70; B60L 3/0069; H02J 7/0047; H02J 7/007
  USPC .......................................................... 320/109
  See application file for complete search history.

(56) References Cited

U.S. PATENT DOCUMENTS

| | | | |
|---|---|---|---|
| 2010/0194354 A1 | 8/2010 | Gotou et al. | |
| 2013/0093427 A1* | 4/2013 | Bemrich | G01R 31/3278 324/418 |
| 2014/0002009 A1* | 1/2014 | Choi | H02J 7/0026 320/107 |
| 2014/0016238 A1* | 1/2014 | Tazaki | H01H 47/002 361/88 |
| 2014/0028681 A1* | 1/2014 | Hirayama | G01R 31/3606 345/440 |

FOREIGN PATENT DOCUMENTS

| | | | |
|---|---|---|---|
| CN | 103532177 | | 1/2014 |
| JP | 2000-173428 | | 6/2000 |
| JP | 2000173428 | * | 6/2000 |
| JP | 2007-026741 | | 2/2007 |
| JP | 2007295751 | | 11/2007 |
| JP | 2009-033790 | | 2/2009 |
| JP | 2010-178454 | | 8/2010 |
| JP | 2011-109872 | | 6/2011 |
| JP | 2013-070465 | | 4/2013 |
| JP | 2013-090543 | | 5/2013 |
| JP | 2013-225996 | | 10/2013 |
| JP | 2014-007954 | | 1/2014 |
| JP | 2014-023236 | | 2/2014 |
| JP | 5461478 | | 4/2014 |
| KR | 10-2013-0039817 | | 4/2013 |
| KR | 10-2014-0000455 | | 1/2014 |
| WO | 2012/111081 | | 8/2012 |

OTHER PUBLICATIONS

Machine English Translation of CN202798008, 24 pages.*
European Patent Office Application Serial No. 15159537.8, Search Report dated Jul. 28, 2015, 6 pages.

* cited by examiner

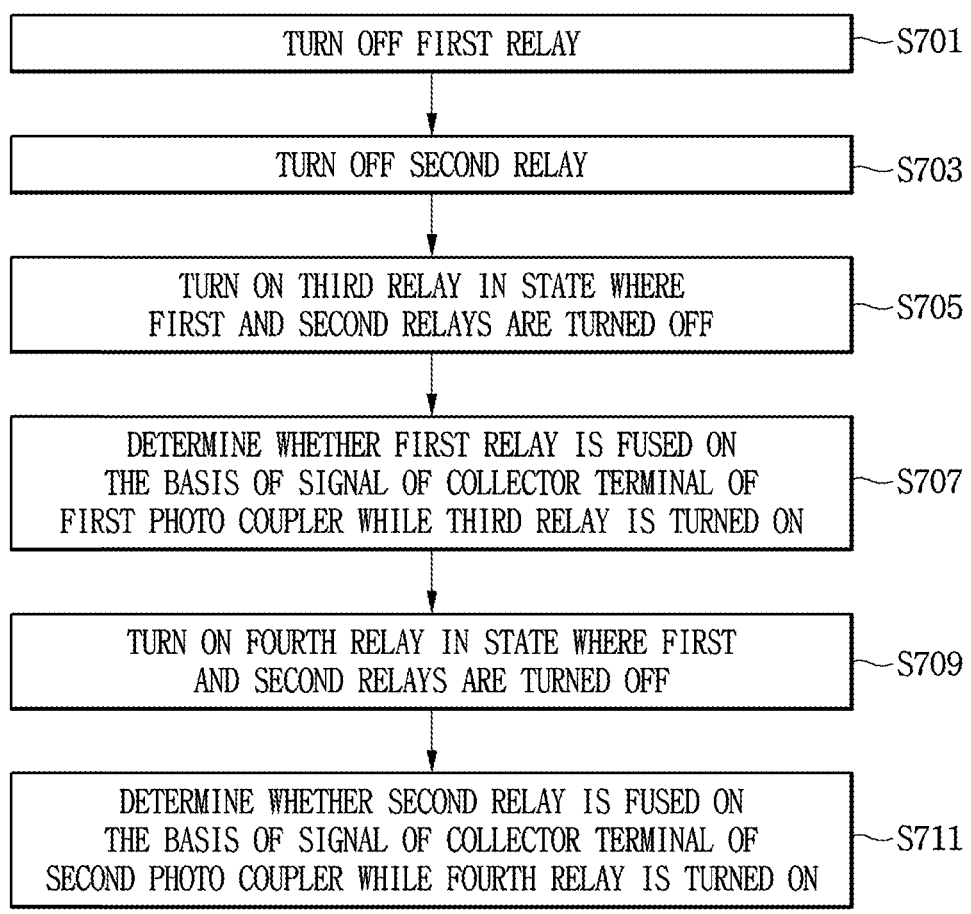

CABLE INSTALLMENT TYPE CHARGING CONTROL DEVICE AND METHOD OF OPERATING THE SAME

CROSS-REFERENCE TO RELATED APPLICATIONS

Pursuant to 35 U.S.C. §119(a), this application claims the benefit of earlier filing date and right of priority to Korean Patent Application No. 10-2014-0032240, filed on Mar. 19, 2014, the contents of which are hereby incorporated by reference herein in its entirety.

BACKGROUND

The present disclosure relates to charging of an electric vehicle.

The electric vehicle refers to a vehicle driven by using electricity, and is mainly classified into a battery powered electric vehicle and a hybrid electric vehicle. The battery powered electric vehicle is driven by using only electricity without fossil fuel, which is generally called an electric vehicle. In addition, the hybrid electric vehicle is driven by using both of the electricity and the fossil fuel. In addition, the electric vehicle is equipped with a battery to supply electricity for driving. In particular, the battery powered electric vehicle and a plug-in type hybrid electric vehicle have batteries charged with power supplied from an external power supply, and drive an electric motor by using the power charged in the battery.

When the electric vehicle is charged with 60 Hz-commercial grid power supplied through a household socket, an electric vehicle charging cable assembly is used.

The electric vehicle charging cable assembly includes a connector connected to the electric vehicle, a plug connected with the socket, and a power cable to link the connector to the plug.

Since the electric vehicle charging cable assembly is used under various environments, a cable installment type charging control device to ensure the stable charging of the electric vehicle may be provided in the electric vehicle charging cable assembly. The cable installment type charging control device is integrally attached to the power cable so that the cable installment type charging control device is not easily separated from the power cable by a user. In order to ensure the stable charging of the electric vehicle, the cable installment type charging control device is necessary to be strong against an external temperature, external humidity, vibration, and impact. If the cable installment type charging control device includes a connector for wired communication, the connector may include a metal port. Accordingly, the cable installment type charging control device may not satisfy the requirements described above.

However, since the user wants to check the charging state, it is necessary for the cable installment type charging control device, which is integrally attached to the electric vehicle charging cable assembly, to notify the user of the charging state.

To this end, the cable installment type charging control device may show the charging-related information or the failure information through LEDs having a predetermined color.

In other words, the user is required to personally check the cable installment type charging control device with the eyes of the user in order to obtain the charging-related information. In general, the user may want to more check the charging state under the environment that it is rainy, cold, or hot. However, the user feels inconvenient because the user goes out under the above weather situation to personally check the cable installment type charging control device with the eyes of the user.

Meanwhile, the cable installment type charging control device includes a power relay for controlling cut off of power transmission so as to control charging of the electric vehicle.

However, since large power is applied to the power relay, the power relay may be fused. When the power relay is fused, it is impossible to control the charging of the electric vehicle, and thus the cable installment type charging control device has to determine whether the power relay is fused.

SUMMARY

Embodiments provide a cable installment type charging control device that is capable of easily determining whether a power relay is fused and a method of operating the same.

In one embodiment, a cable installment type charging control device for charging an electric vehicle (EV) by using power of a grid-side includes: a first relay delivering power of the grid-side to an EV-side; a second relay delivering power of the grid-side to the EV-side; and a first sub fusion detecting unit detecting whether the first relay is fused through an-EV side terminal of the first relay and a grid-side terminal of the second relay.

The first sub fusion detecting unit may include a third relay, a first resistor, and a first photo coupler which are connected to each other in series.

The cable installment type charging control device may further include a control unit.

The control unit may turn on the third relay in a state where the first and second relays are turned off to determine whether the first relay is fused on the basis of a signal of a collector terminal of the first photo coupler.

The cable installment type charging control device may further include a second sub fusion detecting unit for detecting whether the second relay is fused through an EV-side terminal of the second relay and a grid-side terminal of the first relay.

The second sub fusion detecting unit may include a fourth relay, a second resistor, and a second photo coupler.

The control unit may turn on the fourth relay in a state where the first and second relays are turned off to determine whether the second relay is fused on the basis of a signal of a collector terminal of the second photo coupler.

The cable installment type charging control device may further include a communication unit for communicating with an add-on communication device attached to the cable installment type charging control device. The control unit may notify whether the first relay is fused to a terminal device through the communication unit via the add-n communication device.

The details of one or more embodiments are set forth in the accompanying drawings and the description below. Other features will be apparent from the description and drawings, and from the claims.

BRIEF DESCRIPTION OF THE DRAWINGS

FIG. 12 is a flowchart showing a method of detecting fusion according to an embodiment.

DETAILED DESCRIPTION OF THE EMBODIMENTS

Reference will now be made in detail to the embodiments of the present disclosure, examples of which are illustrated in the accompanying drawings.

In the following description, usage of suffixes such as 'module', 'part' or 'unit' used for referring to elements is given merely to facilitate explanation of the present invention, without having any discriminated meaning or role by itself.

A mobile terminal device according to the embodiment may include a cellular phone, a smart phone, a laptop computer, a digital broadcasting receiver, Personal Digital Assistants (PDA), Portable Multimedia Player (PMP), and a navigation device. It may be easily understood by those skilled in the art that the configuration disclosed through the embodiment is applicable to a stationary terminal such as a digital TV or a desktop computer, excluding a case of being applicable only to a mobile terminal.

Hereinafter, description about a first embodiment of an electric vehicle charging system is provided with reference to the accompanying drawings.

Figure 1:
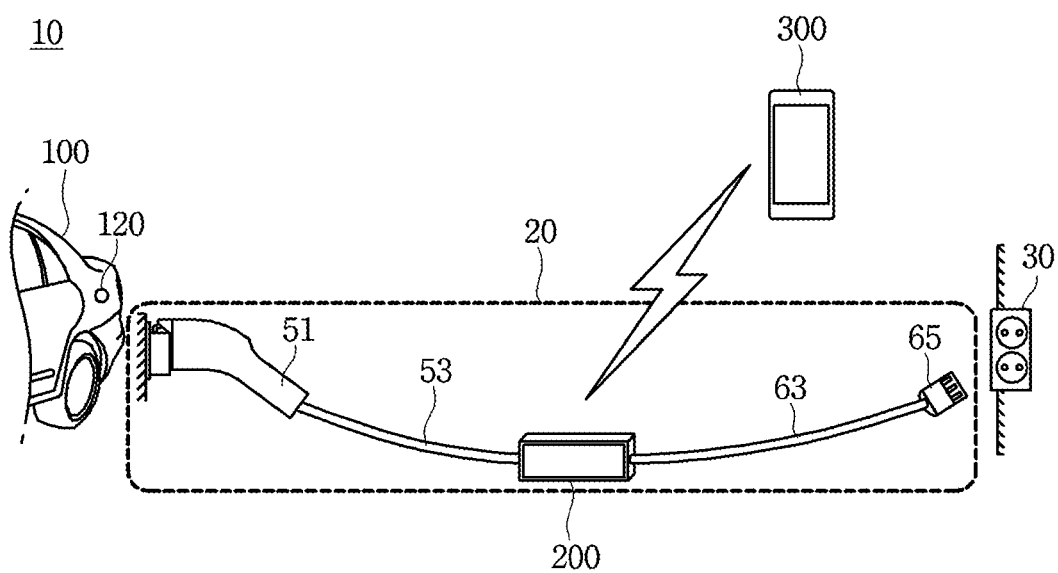
FIG. 1 is a conceptual diagram of an electric vehicle charging system according to an embodiment.

FIG. 1 is a conceptual diagram of an electric vehicle charging system according to an embodiment.

Referring to FIG. 1, an electric vehicle charging system 10 according to an embodiment includes an electric vehicle 100, an electric vehicle charging cable assembly 20, a socket 30, and a terminal device 300.

The socket 30 provides AC power supplied from a grid.

The electric vehicle 100 is connected to the socket 30 through the electric vehicle charging cable assembly 20 and receives the AC power from the socket 30.

The electric vehicle charging cable assembly 20 delivers AC power from the socket 30 to the electric vehicle 100.

The electric vehicle charging cable assembly 20 includes cable installment type charging control device 200, an electric vehicle connector 51, an electric vehicle (EV)-side power cable 53, a plug 65, and a grid-side power cable 63.

The EV-side power cable 53 and the grid-side power cable 63 deliver power.

The electric vehicle connector 51 is inserted into an electric vehicle inlet 120 and connected to the electric vehicle inlet 120, and may adhere to SAE J1772 specification.

The plug 65 is inserted and connected to the socket 30.

The cable installment type charging control device 200 monitors charging the electric vehicle 100, provides charging related information obtained through the monitoring to the terminal device 300, and controls charging of the electric vehicle 100.

In particular, the cable installment type charging control device 200 is integrally attached to the power cable 53 in order not to be easily separated from the EV-side power cable by the user. The cable installment type charging control device 200 have characteristics robust to an external temperature, external humidity, vibration, or impact.

In an embodiment, the cable installment type charging control device 200 may include a connector so as to be connected to or separated from the EV-side power cable 53 by the user. At this point, the connector is necessary to have characteristics robust to an external temperature, external humidity, vibration, or impact.

In an embodiment, the cable installment type charging control device 200 may be integrally attached to the grid-side power cable 63 so as not to be separated from the grid-side power cable 63 by the user. At this point, the connector has characteristics robust to an external temperature, external humidity, vibration, or impact.

In an embodiment, the cable installment type charging control device 200 may include a connector so as to be connected to or separated from the grid-side power cable 63 by the user. At this point, the connector is necessary to have characteristics robust to an external temperature, external humidity, vibration, or impact.

When the cable installment type charging control device 200 includes a connector for wired communication, since this connector includes a metal port, the cable installment type charging control device 200 may be weak to external environments. In order to address such an issue, the cable installment type charging control device 200 may wirelessly transmit charging related information to the terminal device 300.

The terminal device 300 wirelessly communicates in a non-contact scheme with the electric vehicle charging cable assembly 20 and displays information related to the electric vehicle charging cable assembly 20.

Figure 2:
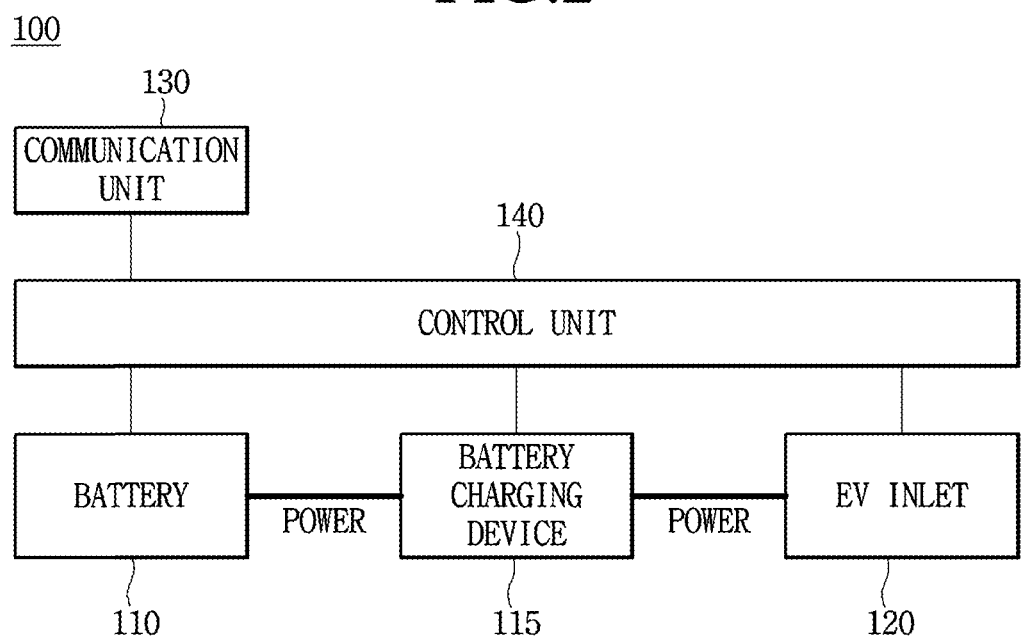
FIG. 2 is a block diagram of an electric vehicle according to an embodiment.

FIG. 2 is a block diagram of an electric vehicle according to an embodiment.

The electric vehicle 100 includes a battery 110, a battery charging device 115, an electric vehicle inlet 120, a communication unit 130, and a control unit 140.

The battery 110 provides power for driving the electric vehicle 100 to the electric vehicle 100.

The electric vehicle inlet 120 is a connector for receiving power for charging of the battery 100 from outside. The electric vehicle inlet 120 may adhere to SAE J1772 specification.

The battery charging device 115 charges the battery 110 by using power provided through the electric vehicle inlet 120.

The communication unit 130 may communicate with the electric vehicle charging cable assembly 20 or the terminal device 300.

The control unit 140 controls an overall operation of the electric vehicle 100.

Figure 3:
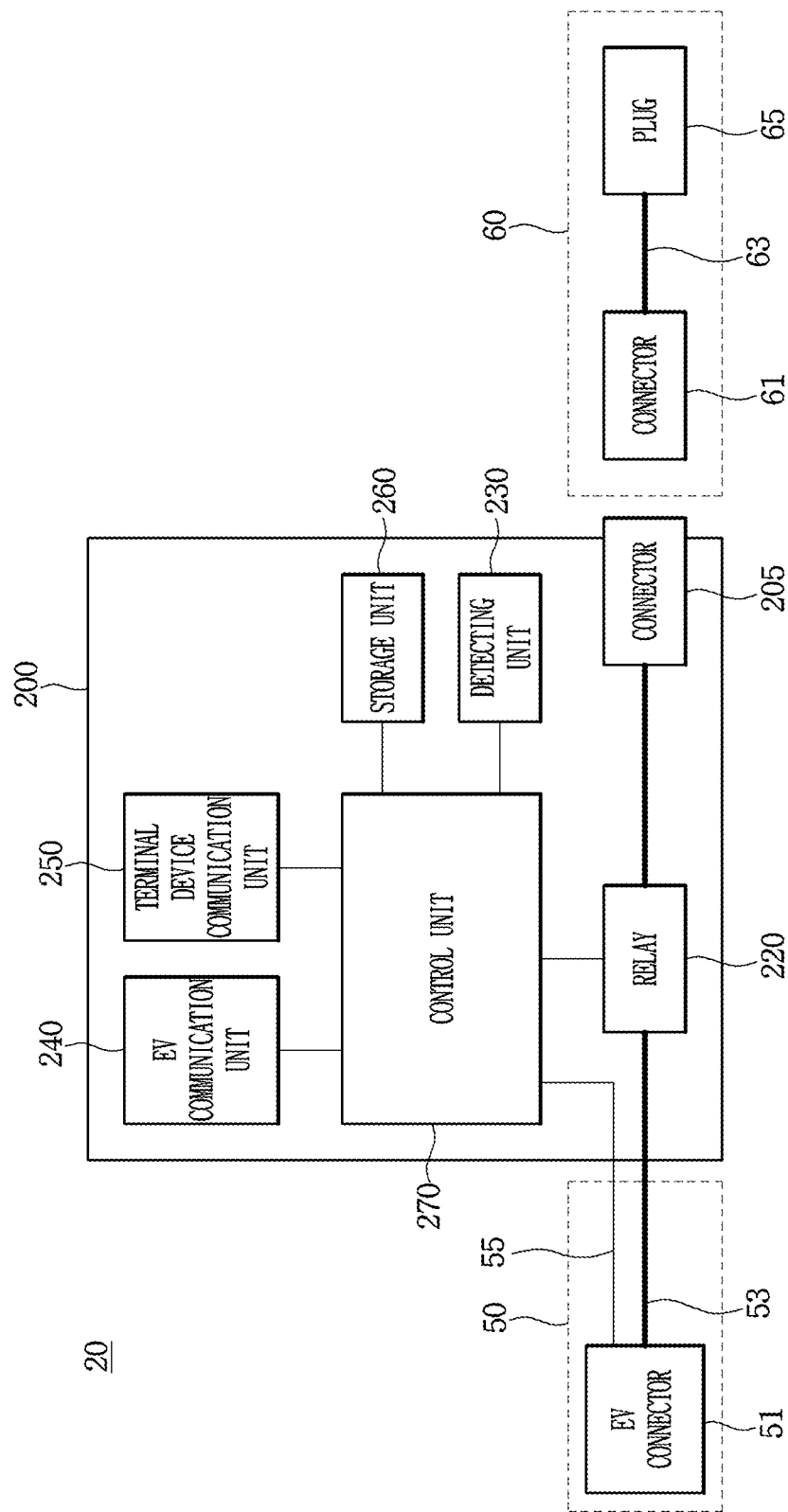
FIG. 3 is a block diagram of an electric vehicle charging cable assembly according to an embodiment.

FIG. 3 is a block diagram of an electric vehicle charging cable assembly according to an embodiment.

The electric vehicle charging cable assembly 20 includes a cable installment type charging control device 200, an electric vehicle (EV)-side power cable assembly 50, and a grid-side power cable assembly 60.

Hereinafter, each of the EV-side power cable assembly 50 and the grid-side power cable assembly 60 may be called sub cable assembly.

The EV-side power cable assembly 50 includes the electric vehicle connector 51, the EV-side power cable 53, and an EV-side data communication cable 55.

The grid-side power cable assembly 60 includes a connector 61, the grid-side power cable 63, and the plug 65.

The cable installment type charging control device 200 includes a connector 205, a relay 220, a detecting unit 230, an electric vehicle communication unit 240, a terminal device communication unit 250, a storage unit 260, and a control unit 270.

The connector 205 may be coupled to the connector 61. The connector 205 may support coupling and separation with respect to the connector 61. That is, the connector 205 may be coupled to or separated from the connector 61.

The relay 220 controls to connect the EV-side power cable 53 to the grid-side power cable 63. In detail, when the relay 220 is turned off, the relay 220 disconnects the EV-side power cable 53 from the grid-side power cable 63. When the relay 220 is turned on, the relay 220 may electrically connect the EV-side power cable 53 to the grid-side power cable 63.

The detecting unit 230 detects information related to charging of the electric vehicle to be described later. In particular, the detecting unit 230 may detect all information on the electric vehicle 100 and information on the electric vehicle charging cable assembly 20. The detecting unit 230 may not detect information on the electric vehicle, but on the electric vehicle charging cable assembly 20.

The electric vehicle communication unit 240 performs communication with the electric vehicle 100. In detail, the electric vehicle communication unit 240 performs communication with the communication unit 130 of the electric vehicle 100. The electric vehicle communication unit 240 may perform communication with the communication unit 130 through the power cable 23 in a power-cable communication scheme. In addition, the electric vehicle communication unit 240 and the communication unit 130 may perform communication with each other through an infrared data association (IrDA) scheme, a radio frequency communication scheme, a Bluetooth scheme, an ultra wideband (UWB) scheme, a ZigBee scheme, and a digital living network alliance (DLNA) scheme.

The terminal device communication unit 250 performs communication with the terminal device 300. In detail, the terminal device communication unit 250 performs communication with a communication unit 310 of the terminal device 300. In particular, the terminal device communication unit 250 and the communication unit 310 may perform communication with each other through an IrDA scheme, a radio frequency communication scheme, a Bluetooth scheme, a UWB scheme, a ZigBee scheme, and a DLNA scheme.

The storage unit 260 stores various pieces of information to be described later. In detail, the storage unit 260 may store the charging related information on the electric vehicle 100. The storage unit 260 may store the information on the use history of the cable installment type charging control device 200. For example, the storage unit 260 may store the information on the final use time point, use time, and accumulated use time of the cable installment type charging control device 200.

The control unit 270 controls the overall operation of the cable installment type charging control device 200 together with the following operation.

Figure 4:
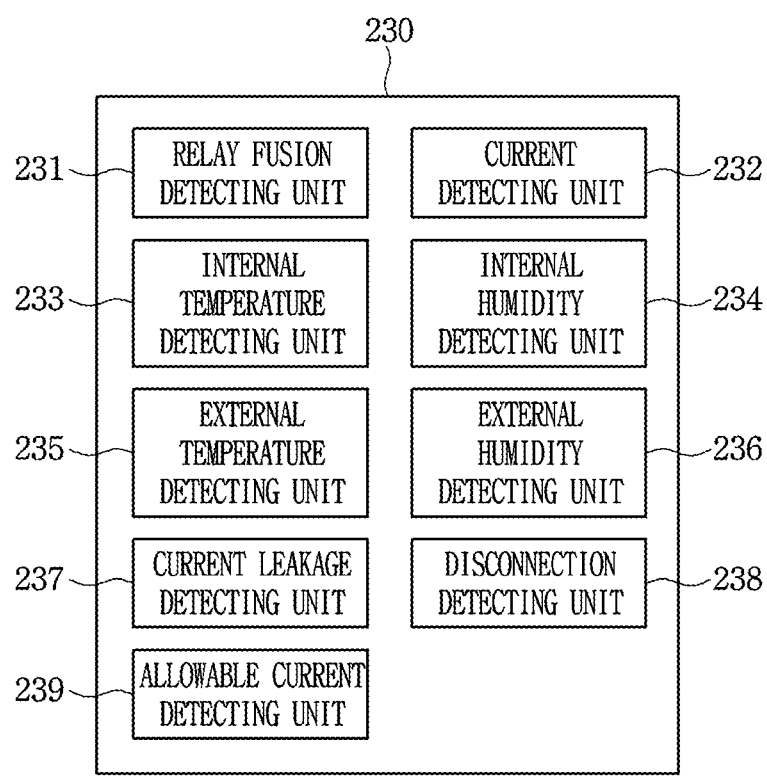
FIG. 4 is a block diagram of a detection unit according to an embodiment.

FIG. 4 is a block diagram of the detecting unit according to an embodiment.

As illustrated in FIG. 4, the detecting unit 230 may include a relay fusion detecting unit 231, a current detecting unit 232, an internal temperature detecting unit 233, an internal humidity detecting unit 234, an external temperature detecting unit 235, an external humidity detecting unit 236, a current leakage detecting unit 237, a disconnection detecting unit 238, and an allowable current detecting unit 239.

The relay fusion detecting unit 231 may detect whether the relay 220 is fused.

The current detecting unit 232 may detect intensity of current flowing through the power cable 53.

The internal temperature detecting unit 233 may detect an internal temperature of the electric vehicle charging cable assembly 20.

The internal humidity detecting unit 234 may detect internal humidity of the electric vehicle charging cable assembly 20.

The external temperature detecting unit 235 may detect a surrounding temperature of the cable installment type charging control device 200.

The external humidity detecting unit 236 may detect surrounding humidity of the cable installment type charging control device 200.

The leakage detecting unit 237 may detect whether current leaks from the electric vehicle charging cable assembly 20.

The disconnection detecting unit 238 may detect whether the electric vehicle charging cable assembly 20 is disconnected.

The allowable current detecting unit 239 may include a first allowable current detecting unit and a second allowable current detecting unit.

The first allowable current detecting unit may detect allowable current of the EV-side power cable assembly 50. In detail, the first allowable current detecting unit may detect allowable current of the EV-side power cable 53.

The second allowable current detecting unit may detect allowable current of the grid-side power cable assembly 60. In detail, the second allowable current detecting unit may detect allowable current of the grid-side power cable.

Figure 5:
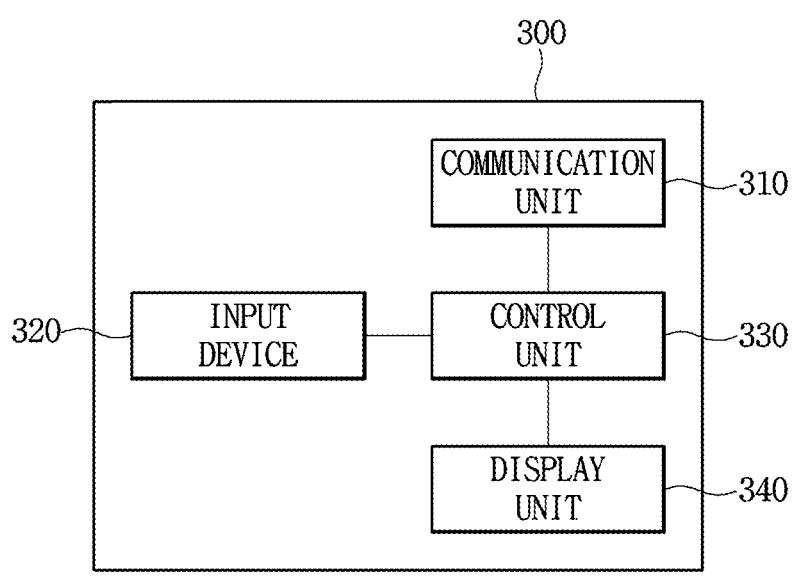
FIG. 5 is a block diagram of a terminal device according to an embodiment.

FIG. 5 is a block diagram of a terminal device according to one embodiment.

The terminal device 300 includes the communication unit 310, an input device 320, a control unit 330, and a display unit 340.

The communication unit 310 performs communication with the terminal device communication unit 250.

The input device 320 obtains a user input. The input device 320 may include at least one of a touch screen, a physical button, a microphone for obtaining the user input in a voice type, an acceleration sensor for obtaining a motion gesture of the terminal device 300 as the user input, a keyboard, a mouse, and a keypad.

The control unit 330 controls the overall operation of the terminal device 300 together with the following operation.

The display unit 340 displays information on the charging operation and a charging state of the cable installment type charging control device 200. The display unit 340 may display information on failure of the cable installment type charging control device 200 and information on action of a user dealing with the failure. For example, the display unit 340 may display information on the charging operation and the charging state of the cable installment type charging control device 200 through visually indicating manners including at least one of characters, geometrical figures, or light, and/or acoustically indicating manners including a sound.

Figure 6:
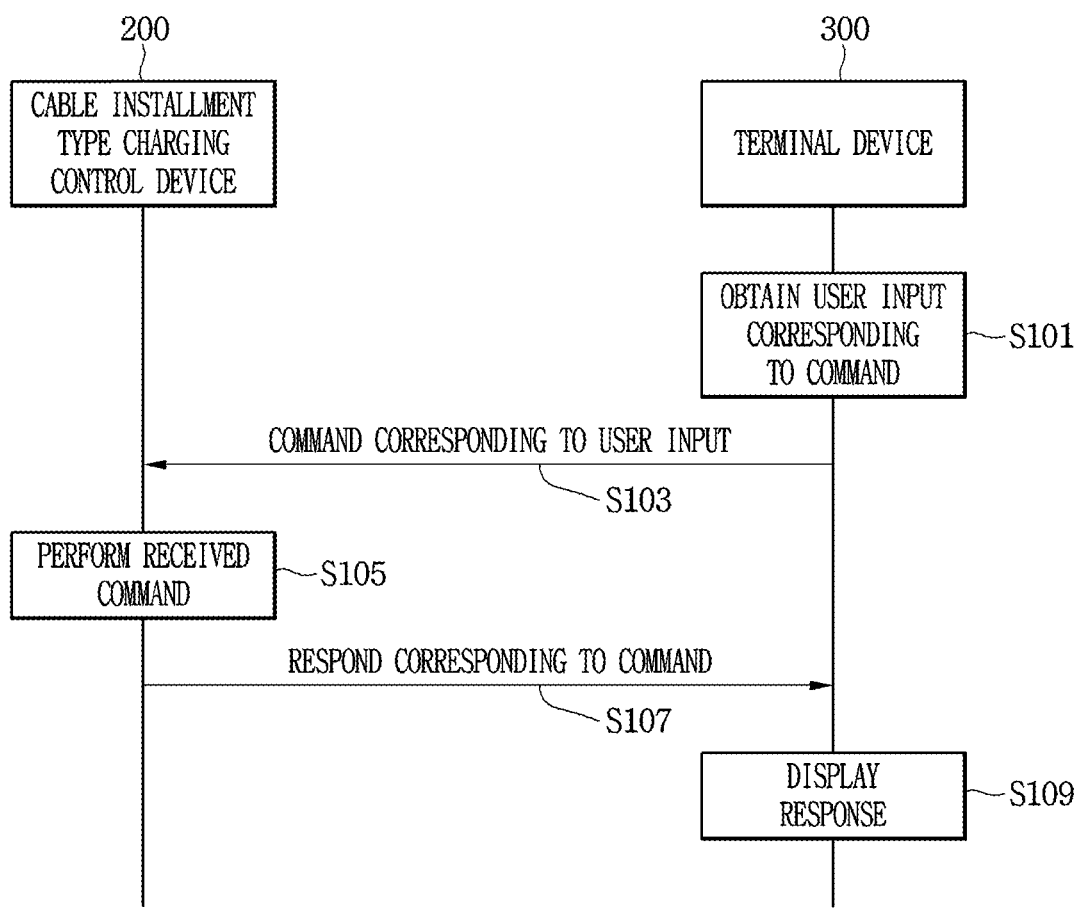
FIG. 6 is a ladder diagram showing an operation method of electric vehicle charging system according to an embodiment.

FIG. 6 is a ladder diagram showing an operation method of electric vehicle charging system according to an embodiment.

The control unit 330 of the terminal device 300 obtains the user input to issue a command to the electric vehicle charging cable assembly 20 through the input device 320 (operation S101). At this point, the user input for controlling the electric vehicle charging cable assembly 20 may include one or more of an input to start charging of the electric vehicle 100, an input to stop the charging of the electric vehicle 100, and an input to request the charging related information on the electric vehicle 100.

The control unit 330 of the terminal device 300 transmits a command corresponding to the obtained user input to the cable installment type charging control device 200 through the communication unit 310 (operation S103). The control unit 270 of the cable installment type charging control device 200 receives the command through the terminal device communication unit 250.

The control unit 270 of the cable installment type charging control device 200 executes the received command (operation S105).

In detail, when the command corresponding to the user input is a command to start the charging of the electric vehicle 100, the control unit 270 of the cable installment type charging control device 200 turns on the relay 220 that has been turned off, so that the electric vehicle charging cable assembly 20 may supply AC power to the electric vehicle 100 through the socket 30.

In more detail, when the command corresponding to the user input is a command to start the charging of the electric vehicle 100, the control unit 270 of the cable installment charging control device 200 may provide at least one of information with respect to allowable current of the EV-side power cable assembly 50 and information with respect to allowable current of the grid-side power cable assembly 60 to the battery charging device 115 of the electric vehicle 100 through the EV-side data communication cable 55. Also, the control unit 270 of the cable installment type charging control device 200 turns on the turned-off relay 220. Then, the battery charging device 115 of the electric vehicle 100 may determine charging current on the basis of the received information and bring the determined charging current through the electric vehicle charging cable assembly 20 to charge the battery 110.

When the control unit 270 provides information with respect to the allowable current of the EV-side power cable assembly 50, the battery charging device 115 of the electric vehicle 100 may charge the battery 110 by using current that is equal to or less than the allowable current.

When the control unit 270 provides information with respect to the allowable current of the grid-side power cable assembly 60, the battery charging device 115 of the electric vehicle 100 may charge the battery 110 by using current that is equal to or less than the allowable current.

When the control unit 270 provides information with respect to the allowable current of the EV-side power cable assembly 50 and information with respect to the allowable current of the grid-side power cable assembly 60, the battery charging device 1150 of the electric vehicle 100 may charge the battery 110 by using current that is equal to or less than the current having a relatively small value of the two allowable current.

When the command corresponding to the user input is a command to stop the charging of the electric vehicle 100, the control unit 270 of the cable installment type charging control device 200 turns off the relay 220, which has been turned on, to prevent the electric vehicle charging cable assembly 20 from charging the electric vehicle 100.

When the command corresponding to the user input is a command to request the charging related information on the electric vehicle 100, the control unit 270 of the cable installment type charging control device 200 collects the charging related information on the electric vehicle 100.

The control unit 270 of the cable installment type charging control device 200 transmits a response to the received command to the terminal device 300 through the terminal device communication unit 250 (operation S107).

When the command corresponding to the user input is the command to start the charging of the electric vehicle 100, the response may include information notifying that the relay 220 is in a turn-on state.

When the command corresponding to the user input is the command to stop the charging of the electric vehicle 100, the response may include information notifying that the relay 220 is in a turn-off state.

When the command corresponding to the user input is the command to request the charging related information on the electric vehicle 100, the response may include the collected charging related information on the electric vehicle 100.

The charging related information on the electric vehicle 100 may include at least one of information on the electric vehicle 100 and the information on the electric vehicle charging cable assembly 20.

The information on the electric vehicle 100 may include at least one of an initial charging state, a current charging state, a charging start time, an estimated charging finish time, an actual charging finish time, charging status information on the electric vehicle 100, charging error information on the electric vehicle 100, information on the power quantity supplied to the electric vehicle 100, and the information on amplitude of current applied to the electric vehicle 100. The initial charging state and the current charging state may be represented as a ratio of a current charged power quantity to the total capacity of the battery 110. The charging status information on the electric vehicle 100 may represent that the electric vehicle 100 is in the middle of being charged with power, in the standby state for charging, or has been completely charged.

The information on the electric vehicle charging cable assembly 20 may include at least one of information on the charging operation of the electric vehicle charging cable assembly 20, information on the use history of the electric vehicle charging cable assembly 20, state information on the electric vehicle charging cable assembly 20, information on the failure of the electric vehicle charging cable assembly 20, information on the allowable current of the EV-side power cable assembly 50, and information on the allowable current of the grid-side power cable assembly 60. The information on the charging operation of the electric vehicle charging cable assembly 20 represents whether the electric vehicle charging cable assembly 20 supplies the power, which is received through the socket 30, to the electric vehicle 100. The state information on the electric vehicle charging cable assembly 20 may include state information on the relay 220, the information on whether the relay 220 is fused, information on temperature of the electric vehicle charging cable assembly 20, information on the short-circuit of the electric vehicle charging cable assembly 20, information on disconnection of the electric vehicle charging cable assembly 20, and information on surrounding environments of the electric vehicle charging cable assembly 20. The state information on the relay 220 may represent whether the relay 220 is turned on or turned off. The information on the surrounding environments of the electric vehicle charging cable assembly 20 may include at least one of information on the surrounding temperature and information on the surrounding humidity.

The control unit 330 of the terminal device 300 displays the received response on the display unit 340 (operation S109).

When the command corresponding to the user input is a command for starting the charging of the electric vehicle 100, the control unit 330 of the terminal device 300 may display the information notifying that the relay 220 is in the turn-on state on the display unit 340.

When the command corresponding to the user input is a command for stopping the charging of the electric vehicle 100, the control unit 330 of the terminal device 300 may display the information notifying that the relay 220 is in the turn-off state on the display unit 340.

When the command corresponding to the user input is a command for requesting the charging related information on the electric vehicle 100, the control unit 330 of the terminal device 300 may display the charging related information on the electric vehicle 100 on the display unit 340. The user may input an additional user input for controlling the electric vehicle charging cable assembly 20, to the terminal device 300 through the input device 320 based on the displayed charging related information on the electric vehicle 100.

As described above, the information on the charging operation and the state information on the electric vehicle charging cable assembly 20 are displayed through the terminal device 300. Accordingly, the user may simply and easily recognize the information on the charging operation and the state information on the electric vehicle charging cable assembly 20. In addition, the user more easily determines the failure of the electric vehicle charging cable assembly 20 and the failed part of the electric vehicle charging cable assembly 20 based on the state information on the electric vehicle charging cable assembly 20, so that the user can easily take an action of dealing with the failure. For example, when the ground line is short-circuited between the electric vehicle charging cable assembly 20 and the power supply, the short-circuited ground line is difficult to detect according to the related art. However, according to the embodiment, the detecting unit 230 detects and displays the disconnection state, so that the user stops the charging of the electric vehicle charging cable assembly 20 and repairs the disconnected part or requests the repair for the disconnected part. In particular, when the information on the failure of the electric vehicle charging cable assembly 20 and the information on the action of dealing with the failure are transmitted to the terminal device 300 from the cable installment type charging control device 200, the user can more simply and easily detect the failure of the electric vehicle charging cable assembly 20 and take an action of dealing with the failure. Accordingly, the user can recognize in advance that the electric vehicle 100 is not charged due to the failure of the electric vehicle charging cable assembly 20. In addition, for example, if the use history of the electric vehicle charging cable assembly 20 is transmitted to the terminal device 300, the user can estimate in advance the life span of the electric vehicle charging cable assembly 20 and prepare an additional electric vehicle charging cable assembly.

On the other hand, frequent uses under an inferior environment cause the electric vehicle charging cable assembly 20 to be frequently repaired or replaced. However, when the electric vehicle charging cable assembly 20 includes the cable installment type charging control device 200 including relatively expensive terminal device communication unit 250, it is more difficult to repair the electric vehicle charging cable assembly 20 due to the characteristics of the cable installment type charging control device 200 manufactured to have the characteristics robust to an external temperature, external humidity, vibration, and impact, and a replacement cost may be increased.

In order to address the above-described issue, the terminal device communication unit 250 may be separated from the cable installment type charging control device 200. Such an embodiment will be described with reference to FIGS. 7 to 10.

Figure 7:
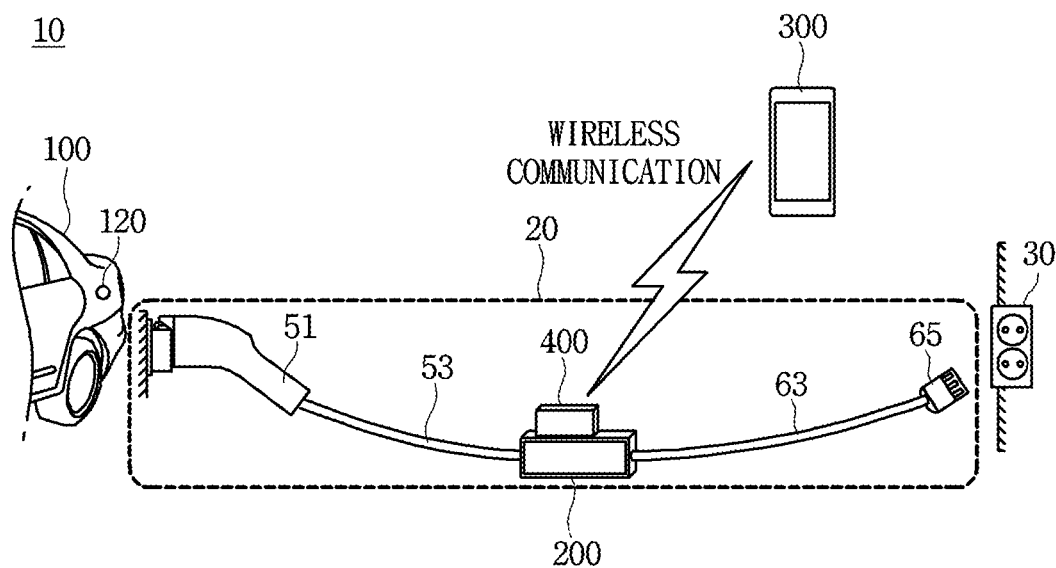
FIG. 7 is a conceptual diagram of an electrical vehicle charging system according to another embodiment.

FIG. 7 is a conceptual diagram of an electrical vehicle charging system according to another embodiment Referring to FIG. 7, an electric vehicle charging system 10 according to an embodiment includes an electric vehicle 100, an electric vehicle charging cable assembly 20, a socket 30, a terminal device 300, and an add-on communication device 400.

In particular, since the add-on communication device 400 is added to the system of FIG. 1 to constitute the system of FIG. 7, the system of FIG. 7 has the same constitutions except for the add-on communication device 400, and thus the detailed description of the system of FIG. 7 will be omitted.

The cable installment type charging control device 200 monitors the charging of the electric vehicle 100, and provides the charging related information obtained through the monitoring to the add-on communication device 400, thereby controlling the charging of the electric vehicle 100.

When the cable installment type charging control device 200 includes a connector for wired communication, since the connector includes a metal port, the cable installment type charging control device 200 may be weak to external environments. In order to address the above issue, the cable installment type charging control device 200 may perform wireless communication with the add-on communication device 400.

The terminal device 300 performs wireless communication with the add-on communication device 400 in a non-contact scheme and displays the information on the electric vehicle charging cable assembly 20.

The add-on communication device 400 is attached to the cable installment type charging control device 200. At this point, the add-on communication device 400 may be mechanically coupled with the cable installment type charging control device 200. In addition, the add-on communication device 400 may be attached to the cable installment type charging control device 200 by a magnetic force.

Figure 8:
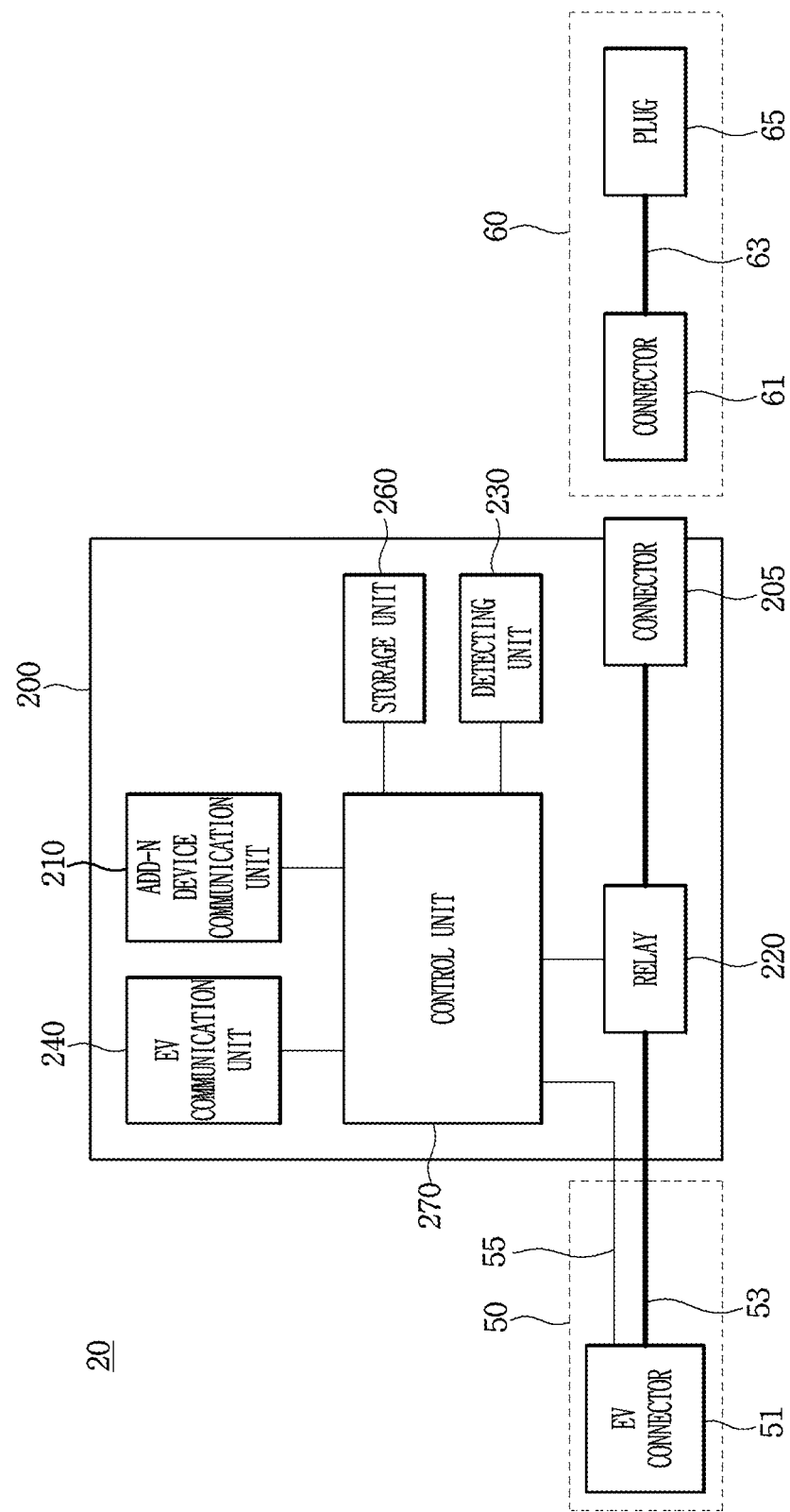
FIG. 8 is a block diagram of an electrical vehicle charging cable assembly according to another embodiment.

FIG. 8 is a block diagram of an electric vehicle charging cable assembly according to another embodiment.

When comparing with the embodiment of FIG. 3, the cable installment type charging control device 200 shown in FIG. 8 further includes the add-on device communication unit 210. In addition, although the cable installment type charging control device 200 shown in FIG. 8 may not include the terminal device communication unit 250 in order to reduce the price and the repair cost, the cable installment type charging control device 200 may include the terminal device communication unit 250 according to various applications.

Since the relay 220, the detecting unit 230, the electric vehicle communication unit 240, the storage unit 260, and the control unit 270 according to the embodiment are the same as or similar to those of the embodiment of FIG. 3, or may be described later.

The add-on device communication unit 210 performs communication with the add-on communication device 400. The add-on device communication unit 210 and the add-on communication device 400 may perform communication with each other through an IrDA scheme, a radio frequency communication scheme, a Bluetooth scheme, a UWB scheme, a ZigBee scheme, and a DLNA scheme.

In particular, in order to reduce the price of the electric vehicle charging cable assembly 20 and the add-on communication device 400, the add-on device communication unit 210 may adopt the IrDA scheme. At this point, the add-on device communication unit 210 may include an infrared light emitting diode and an infrared light receiving diode.

Figure 9:
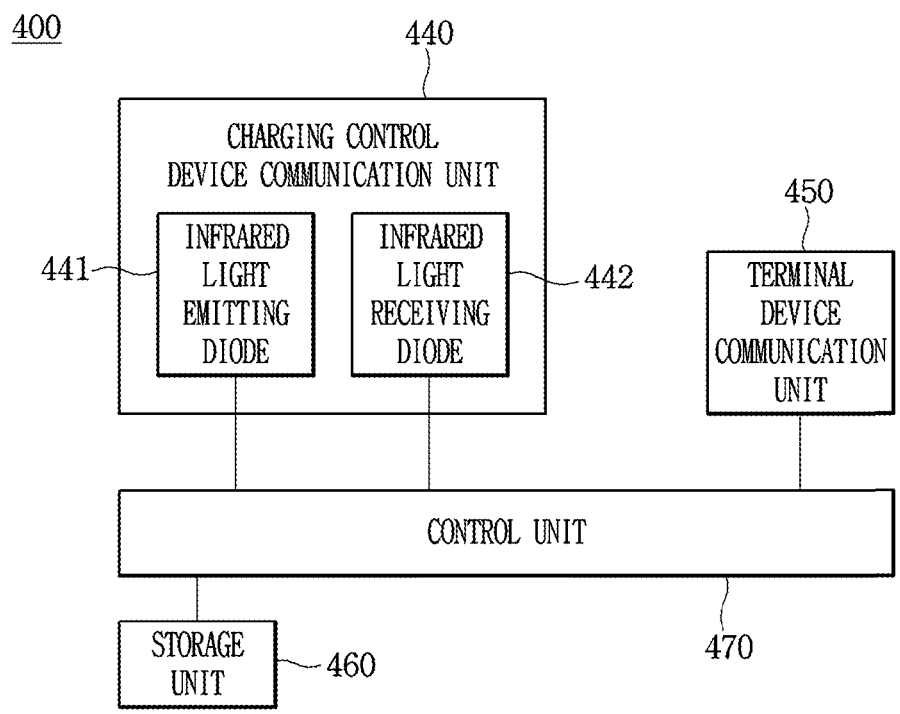
FIG. 9 is a block diagram of an add-on communication apparatus according to an embodiment.

FIG. 9 is a block diagram of an add-on communication device according to an embodiment.

The add-on communication device 400 includes a charging control device communication unit 440, a terminal communication unit 450, a storage unit 460, and a control unit 470.

The charging control device communication unit 440 performs communication with the cable installment type charging control device 200. In detail, the charging control device communication unit 440 performs communication with the add-on device communication unit 210 of the cable installment type charging control device 200. The charging control device communication unit 440 and the add-on device communication unit 210 may perform communication with each other through an IrDA scheme, a radio frequency communication scheme, a Bluetooth scheme, a UWB scheme, a ZigBee scheme, and a DLNA scheme.

In order to reduce the price of the electric vehicle charging cable assembly 20 and the add-on communication device 400, the charging control device communication unit 440 may employ the IrDA scheme. At this point, the charging control device communication unit 440 may include an infrared light emitting diode 441 and an infrared light receiving diode 442.

When the add-on communication device 400 is normally attached to the cable installment type charging control device 200, positions of the infrared light emitting diode 441 and the infrared light receiving diode 442 of the charging control device communication unit 440 are matched with the infrared light receiving diode and the infrared light emitting diode of the add-on device communication unit 210 of the cable installment type charging control device 200, respectively.

The terminal communication unit 450 performs communication with the terminal device 300. In detail, the terminal communication unit 450 performs communication with the communication unit 310 of the terminal device 300. In detail, the terminal communication unit 450 and the communication unit 310 may perform communication with each other through an IrDA scheme, a radio frequency communication scheme, a Bluetooth scheme, a UWB scheme, a ZigBee scheme, and a DLNA scheme. In particular, the terminal communication unit 450 may perform communication with the terminal device 300 by using at least one of a wireless local area network (WLAN) such as Wi-Fi specified in IEEE 802.11 and wireless wide area network (WWAN) specified in IEEE 802.16 or long term evolution (LTE) specification.

The storage unit 460 stores following information. In detail, the storage unit 460 may store the charging related information on the electric vehicle 100. The storage unit 460 may store information on the use history of the cable installment type charging control device 200. For example, the storage unit 460 may store information on a final use time point, use time, and accumulated use time of the cable installment type charging control device 200.

The control unit 470 controls an overall operation of the add-on communication device 400 together with the following operation.

Since the add-on communication device 400 is not directly and electrically connected to the cable installment type charging control device 200, the add-on communication device 400 is necessary to additionally receive power. However, when a user does not use the add-on communication device 400, the user may not cut off the power supplied to the add-on communication device 400. Accordingly, since the unnecessary power consumption is increased, a scheme of minimizing power consumption is required when the add-on communication device 400 is not used.

Figure 10:
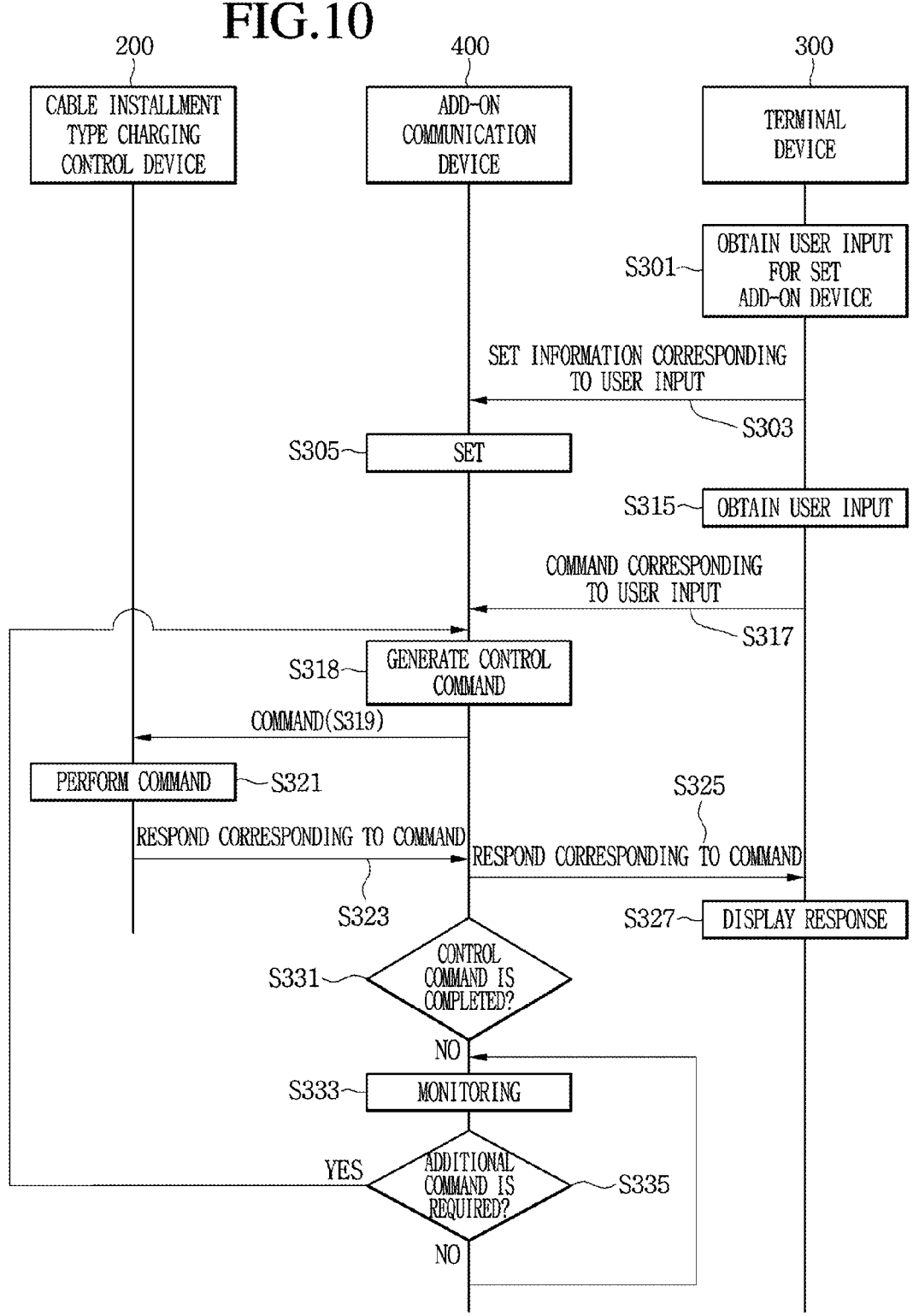
FIG. 10 is a ladder diagram showing an operating method of an electric vehicle charging system according to another embodiment.

FIG. 10 shows a ladder diagram of an operation method of the electric vehicle charging system 10 according to another embodiment.

The control unit 330 of the terminal device 300 obtains a user input for setting the add-on communication device 400 (operation S301). The user input for setting the add-on communication device 400 may include at least of an allowable charge amount and a charging mode. The allowable charge amount may include at least one of an allowable charge amount in a public area and an allowable charge amount in a home area. The charging mode may include at least one of a charging mode in a public area and in a home area. The allowable charge amount may be represented as an absolute value represented as a unit such as Wh or a relative value represented as a unit such as %. A set of values that the charging mode may represent may include a high speed charging mode and a low speed charging mode.

The control unit 330 of the terminal device 300 controls the communication unit 310 to transmit setting information corresponding to the user input that is obtained by the communication unit 310 to the add-on communication device 400 through the EV-side data communication cable 55 (operation S303). At this point, the setting information may include at least one of setting information on the allowable charge amount and setting information on the charging mode. The setting information on the allowable charge amount may include at least one of setting information on allowable charge amount in the public area and setting information on allowable charge amount in the home area. The setting information on the charging mode may include at least one of setting information on charging mode in the public area and setting information on charging mode in the home area. Through this, the control unit 407 of the add-on communication device 400 receives the setting information from the terminal device 300 through the terminal communication unit 450.

The add-on communication device 400 stores the received setting information in the storage area 460 and sets the add-on communication device 400 based on the received setting information (operation S305).

Furthermore, the control unit 330 of the terminal device 300 obtains a user input for commanding the electric vehicle charging cable assembly 20 through the input device 320 (operation S315). At this point, the user input for controlling the electric vehicle charging cable assembly 20 may include one or more of an input to start charging of the electric vehicle 100, an input to stop the charging of the electric vehicle 100, and an input to request the charging related information on the electric vehicle 100. The user input may include at least one of high speed charging start and low speed charging start.

The control unit 330 of the terminal device 300 transmits a command corresponding to the obtained user input to the add-on communication device 400 through the communication unit 310 (operation S317). The control unit 470 of the add-on communication device 400 may receive a command from the terminal device 300 through the terminal communication unit 450. At this point, a set of values that the command may represent may include charging start of the electric vehicle 100, charging stop of the electric vehicle 100, a request for charging related information on the electric vehicle 100. A set of values that the charging start of the electric vehicle 100 may represent may include the high speed charging start and low speed charging start of the electric vehicle 100.

The control unit 470 of the add-on communication device 400 creates a control command for controlling the cable installment type charging control device 200 (operation S318). The control unit 470 of the add-on communication device 400 may create the control command on the basis of at least one of a command received from the terminal device 300, a current position, and setting information and a charging state of the electric vehicle 100 which is a monitoring result to be described later. At this point, a set of values that the control command may represent may include charging start, charging stop, or a request for charging related information on the electric vehicle. A set of values that the charging start may represent may include the high speed charging start and low speed charging start.

In an embodiment, when the command received from the terminal device 300 is the charging start, the control unit 470 of the add-on communication device 400 may create a control command representing the charging start.

In an embodiment, when the command received from the terminal device 300 is the high speed charging start, the control unit 470 of the add-on communication device 400 may create a control command representing the high speed charging start.

In an embodiment, when the command received from the terminal device 300 is the low speed charging start, the control unit 470 of the add-on communication device 400 may create a control command representing the low speed charging start.

In an embodiment, when the command received from the terminal device 300 is the charging start and the set charging mode is the high speed charging mode, the control unit 470 of the add-on communication device 400 may create a control command representing the high speed charging start.

In an embodiment, when the command received from the terminal device 300 is the charging start and the set charging mode is the low speed charging mode, the control unit 470 of the add-on communication device 400 may create a control command representing the low speed charging start.

In an embodiment, when the command received from the terminal device 300 is the charging stop, the control unit 470 of the add-on communication device 400 may create a control command representing the charging stop.

In an embodiment, when the command received from the terminal device 300 is the request for charging related information on the electric vehicle, the control unit 470 of the add-on communication device 400 may create a control command representing the request for charging related information on the electric vehicle.

In an embodiment, when the command received from the terminal device 300 is the charging start and the current position is in the home area, the control unit 470 of the add-on communication device 400 may create a control command representing the charging start according to the charging mode set in the home area. In detail, when the set charging mode in the home area is the high speed charging mode, the control unit 470 of the add-on communication device 400 may create a control command representing the high speed charging start. When the set charging mode in the home area is the low speed charging mode, the control unit 470 of the add-on communication device 400 may create a control command representing the low speed charging start.

In an embodiment, when the command received from the terminal device 300 is the charging start and the current position is in the public area, the control unit 470 of the add-on communication device 400 may create a control command representing the charging start according to the set charging mode in the public area. In detail, when the set charging mode in the public area is the high speed charging mode, the control unit 470 of the add-on communication device 400 may create a control command representing the high speed charging start. When the set charging mode in the public area is the low speed charging mode, the control unit 470 of the add-on communication device 400 may create a control command representing the low speed charging start.

In an embodiment, when the command received from the terminal device is the charging start and the current position is in the home area, the control unit 470 of the add-on communication device 400 may create a control command representing the low speed charging start.

In an embodiment, when the command received from the terminal device is the charging start and the current position is in the public area, the control unit 470 of the add-on communication device 400 may create a control command representing the high speed charging start.

In an embodiment, when the command received from the terminal device is the charging start and a power quantity supplied to the electric vehicle 100 reaches the set allowable charge amount according to the monitoring result, the control unit 470 of the add-on communication unit 400 may create a control command representing the charging stop.

In an embodiment, when the command received from the terminal device is the charging start, the current position is in the home area, and a power quantity supplied to the electric vehicle 100 reaches the set allowable charge amount in the home area according to the monitoring result, the control unit 470 of the add-on communication unit 400 may create a control command representing the charging stop.

In an embodiment, when the command received from the terminal device is the charging start, the current position is the public area, and a power quantity supplied to the electric vehicle 100 reaches the set allowable charge amount in the public area according to a monitoring result, the control unit 470 of the add-on communication unit 400 may create a control command representing the charging stop.

To this end, the control unit 470 of the add-on communication device 400 may obtain a current position of the electric vehicle 100. The control unit 470 of the add-on communication device 400 may obtain the current position of the electric vehicle 100 by using one or more of information on a global positioning system (GPS), information on a base station of a wireless short range network, and information on a base station in a wireless long range network.

A set of values that the current position may represent may be the home area and the public area.

The control unit 470 of the add-on communication device 400 transmits the created control command to the cable installment type charging control device 200 through the charging control device communication unit 440 (operation S319). The infrared light emitting diode 441 of the charging control device communication device 440 may emit an infrared light having a digital pattern corresponding to the created control command.

The control unit 270 of the cable installment type charging control device 200 executes the received control command (operation S321).

In detail, when the command corresponding to the user input is the charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100.

When the a command corresponding to the user input is the high speed charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100 in a high speed.

When the a command corresponding to the user input is the low speed charging start of the electric vehicle 100, the control unit 270 of the cable installment type charging control device 200 may turn on the relay 220 which is turned off and allows the electric vehicle charging cable assembly 20 to provide AC power from the socket 30 to the electric vehicle 100 in a low speed.

When the command corresponding to the user input is the charging stop of the electric vehicle 100, the control unit 270 of the cable installment type charging control device 200 may turn off the relay 220 which is turned on and prevents the electric vehicle charging cable assembly 20 from charging the electric vehicle 100 any longer.

When the command corresponding to the user input is the request for charging related information on the electric vehicle, the control unit 270 of the cable installment type charging control device 200 may collect the charging related information on the electric vehicle.

The control unit 270 of the cable installment type charging control device 200 transmits a response corresponding to the received command to the add-on communication device 400 through the add-on device communication unit 210 (operation S323). The infrared light emitting diode of the add-on device communication unit 210 of the cable installment type charging control device 200 may emit an infrared light having a digital pattern corresponding to a response to the receive command. The control unit 470 of the add-on communication device 400 may receive a response from the cable installment type charging control device 200 through the charging control device communication unit 440.

When the command corresponding to the user input is the charging start of the electric vehicle 100, the response may include information notifying that the relay 220 is in a turned on state.

When the command corresponding to the user input is the high speed charging start of the electric vehicle 100, the response may include information notifying that the relay 220 is in a turned on state for high speed charging.

When the command corresponding to the user input is the low speed charging start of the electric vehicle 100, the response may include information notifying that the relay 220 is in a turned on state for low speed charging.

When the command corresponding to the user input is the charging stop of the electric vehicle 100, the response may include information notifying that the relay 220 is in a turned off state.

When the command corresponding to the user input is the request for charging related information on the electric vehicle 100, the response may include collected charging related information on the electric vehicle 100. As describe above, the charging relation information on the electric vehicle 100 may include at least one of information on the electric vehicle 100 and information on the electric vehicle charging cable assembly 20.

The control unit 470 of the add-on communication device 400 transmits the received response to the terminal device 300 through the terminal communication unit 450 (operation S325).

The control unit 330 of the terminal device 300 displays the received response on the display unit 340 (operation S327). Since the operation described in operation S109 may be applied to the operation described in the operation S327, detailed description about the operation S327 is omitted.

On the other hand, the control unit 470 of the add-on communication device 400 checks whether the created control command is completed (operation S331).

When the created control command is the charging start, the allowable charge amount is set, and the charging is not completed, the control unit 470 of the add-on communication device 400 may determine that the created control command is not completed.

When the created control command is the charging stop, the request for charging related information on the electric vehicle, or the charging start in a state where the allowable charge amount is not set, the control unit 470 of the add-on communication device 400 may determine that the created control command is completed.

When the received control command is completed, the control unit 470 of the add-on communication device 400 may wait for receiving new setting information or a new command.

When the received control command is not completed, the control unit 470 of the add-on communication device 400 monitors a charging state of the electric vehicle 100 (operation S333). In particular, the control unit 470 of the add-on communication device 400 may monitor a power quantity supplied to the electric vehicle 100.

The control unit 470 of the add-on communication device 400 checks whether an additional control command is necessary for the cable installment type charging control device 200 on the basis of at least one of the charging state of the electric vehicle 100 and the setting information (operation S335). In detail, the control unit 470 of the add-on communication device 400 may compare the power quantity supplied to the electric vehicle 100 and the set allowable charge amount and check whether the additional control command is necessary for the cable installment type charging control device 200. When the power quantity supplied to the electric vehicle 100 reaches the set allowable charge amount, the control unit 470 of the add-on communication device 400 may determine that the additional control command is necessary for the cable installment type charging control device 200. When the power quantity supplied to the electric vehicle 100 does not reach the set allowable charge amount, the control unit 470 of the add-on communication device 400 may not determine that the additional control command is necessary for the cable installment type charging control device 200.

When the additional control command is not necessary, the control unit 470 of the add-on communication device 400 may continuously monitor the charging state of the electric vehicle 100.

When the additional control command is necessary, the control unit 470 of the add-on communication device 400 creates the additional control command (operation S318). The creation of the control command in this case is as described above, the description about that is omitted here.

Hereinafter, a fusion detecting method according to an embodiment will be described with reference to FIGS. 11 and 12.

Figure 11:
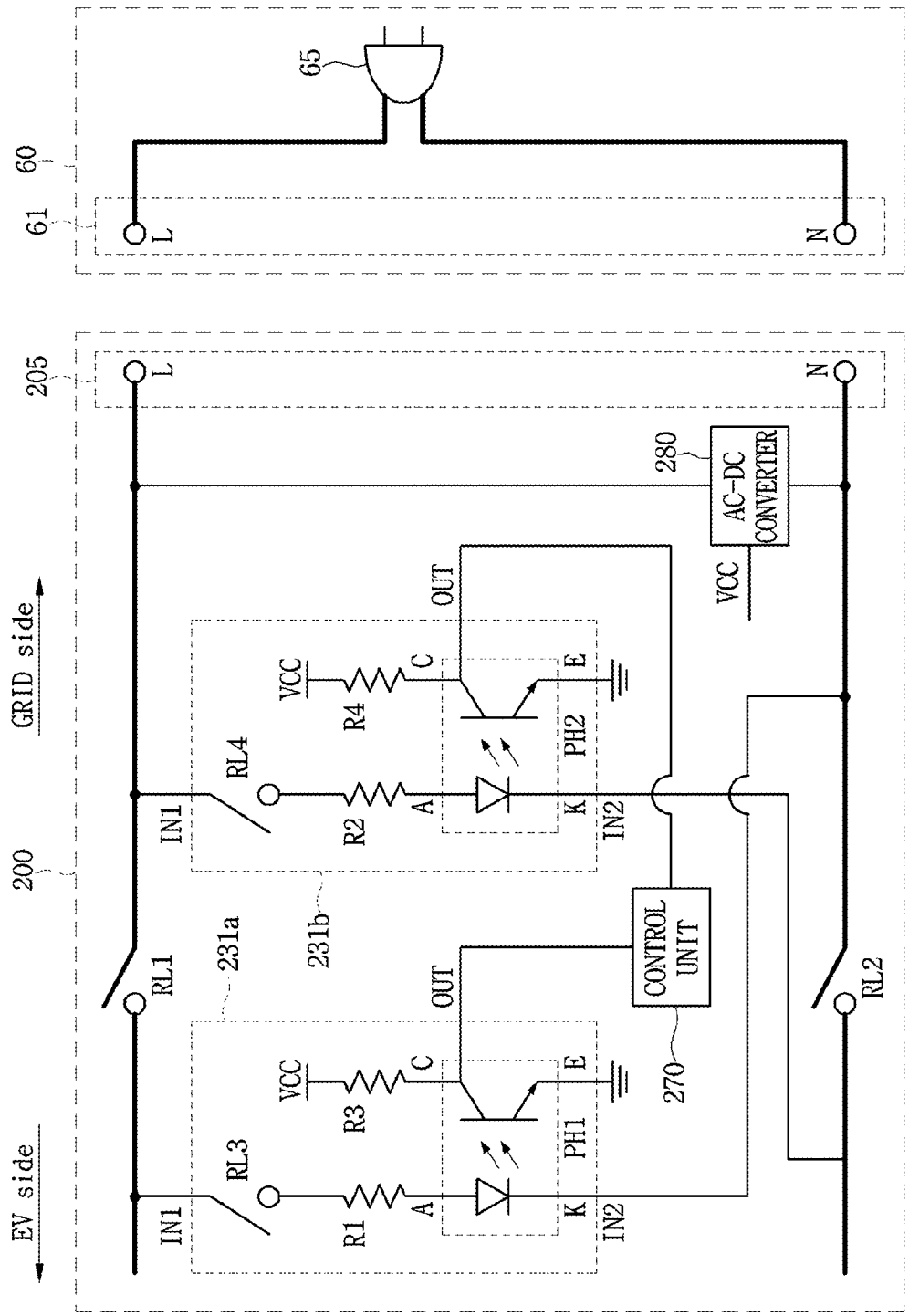
FIG. 11 is a detail view of a fusion detection unit according to an embodiment.

FIG. 11 is a detail view of a fusion detecting unit according to an embodiment.

As illustrated in FIG. 11, the cable installment type charging control device 200 may further include an AC-DC converter 280. The AC-DC converter 280 may generate a driving voltage VCC by using AC power between a grid-side terminal of a first relay RL1 and a grid-side terminal of a second relay RL2.

The relay 220 includes the first relay RL1 and the second relay RL2. The fusion detecting unit 231 includes a first sub fusion detecting unit 231a for detecting fusion of the first relay RL1 and a second sub fusion detecting unit 231b for detecting fusion of the second relay RL2.

The first sub fusion detecting unit 231a may have at least two input terminals and at least one output terminal. The first sub fusion detecting unit 231a may detect whether the first relay RL1 is fused through the at least two input terminals IN1 and IN2 to output a detection signal representing the fusion to the output terminal OUT.

The second sub fusion detecting unit 231b may have at least two input terminals and at least one output terminal. The second sub fusion detecting unit 231b may detect whether the second relay RL2 is fused through the at least two input terminals IN1 and IN2 to output a detection signal representing the fusion to the output terminal OUT.

The first sub fusion detecting unit 231a and the second sub fusion detecting unit 231b may be connected to the first and second relays RL1 and RL2. That is, the first input terminal IN1 of the first sub fusion detecting unit 231a may be connected to the EV-side terminal of the first relay RL1, and the second input terminal IN2 may be connected to the grid-side terminal of the second relay RL2. The first input terminal IN1 of the second sub fusion detecting unit 231a may be connected to the grid-side terminal of the first relay RL1, and the second input terminal IN2 may be connected to the EV-side terminal of the second relay RL2.

The first sub fusion detecting unit 231a includes the third relay RL3, a first resistor R1, a first photo coupler PH1, and a first pull-up resistor R3. The third relay RL3, the first resistor R1, and the first photo coupler PH1 may be disposed in series in the first sub fusion detecting unit 231a.

The third relay RL3 may have one end that is connected to the EV-side terminal of the first relay RL1.

The first resistor R1 may have one end that is connected to the other end of the third relay RL3.

An anode terminal A of the first photo coupler PH1 may be connected to the other end of the first resistor R1, and a cathode terminal K of the first photo coupler PH1 may be connected to the grid-side terminal of the second relay RL2. Also, a collector terminal C of the first photo coupler PH1 may be connected to one end of the first pull-up resistor R2, and an emitter terminal E of the first photo coupler PH1 may be connected to the ground.

The first pull-up resistor R3 may have the other end that is connected to the driving voltage VCC.

The second sub fusion detecting unit 231b includes a fourth relay RL4, a second resistor R2, a second photo coupler PH2, and a second pull-up resistor R4. The fourth relay RL4, the second resistor R2, and the second photo coupler PH2 may be disposed in series in the second sub fusion detecting unit 231b.

The fourth relay RL4 may have one end that is connected to the grid-side terminal of the second relay RL2.

The second resistor R1 may have one end that is connected to the other end of the fourth relay RL4.

An anode terminal A of the second photo coupler PH2 may be connected to the other end of the second resistor R2, and a cathode terminal K may be connected to the EV-side terminal of the first relay RL1. Also, a collector terminal C of the second photo coupler PH2 may be connected to one end of the second pull-up resistor R4, and an emitter terminal E may be connected to the ground.

The second pull-up resistor R4 may have the other end that is connected to the driving voltage VCC.

FIG. 12 is a flowchart showing a fusion detecting method according to an embodiment.

The control unit 270 turns off the first relay RL1 (operation S701).

The control unit 270 turns off the second relay RL2 (operation S703).

The control unit 270 turns off the third relay RL3 in a state where the first and second relays RL1 and RL2 are turned off (operation S705). Here, the control unit 270 may provide a turn-on signal having a pulse shape to the third relay RL3 to control the third relay RL3 so that the third relay RL3 is turned on for a while and then is turned off.

The control unit 270 determines whether the first relay RL1 is fused on the basis of a signal of the collector terminal C of the first photo coupler PH1 while the third relay RL3 is turned on (operation S707).

If the first relay RL 1 is fused even though the first relay RL1 is controlled to be turned off, when the third relay RL3 is turned on, current may be applied to a light emitting diode of the first photo coupler PH1 to emit light from the light emitting diode. Thus, a transistor of the first photo coupler PH1 may be turned on, and the collector terminal C of the first photo coupler PH1 may output a logic low signal.

On the other hand, when the first relay RL is controlled to be turned off, and the first relay RL1 is not fused, the current may not be applied to the light emitting diode of the first photo coupler PH1 even though the third relay RL3 is turned on. Thus, the transistor of the first photo coupler PH1 may be turned off, and thus the collector terminal C of the first photo coupler PH1 may output a logic high signal.

When the turn-on signal having a pulse shape is applied to the third relay RL3, the control unit 270 may determined whether the first relay RL1 is fused on the basis of whether the collector terminal C of the first photo coupler PH1 outputs a signal having a pulse shape.

The control unit 270 turns on the fourth relay RL4 in a state where the first and second relays RL1 and RL2 are turned off (operation S709). Here, the control unit 270 may provide the turn-on signal having a pulse shape to the fourth relay RL4 to control the fourth relay RL4 so that the fourth relay RL4 is turned on for a while and then is turned off.

The control unit 270 may determine whether the second relay RL2 is fused on the basis of a signal of the collector of the second photo coupler PH2 while the fourth relay RL4 is turned on (operation S711).

If the second relay RL2 is fused even though the second relay RL2 is controlled to be turned off, when the third relay RL3 is turned on, current may be applied to the light emitting diode of the first photo coupler PH1 to emit light from the light emitting diode. Thus, the transistor of the first photo coupler PH1 may be turned on, and thus the collector terminal C of the first photo coupler PH1 may output a light low signal.

On the other hand, when the second relay RL2 is controlled to the turned off, and the second relay RL2 is not fused, the current may not be applied to the light emitting diode of the first photo coupler PH1 even though the third relay RL3 is turned on. Thus, the transistor of the first photo coupler PH1 may be turned off, and thus the collector terminal C of the first photo coupler PH1 may output a logic high signal.

When the turn-on signal having a pulse shape is applied to the fourth relay RL4, the control unit 270 may determine whether the second relay RL2 is fused on the basis whether the collector terminal C of the second photo coupler PH2 outputs a signal having a pulse shape.

When it is determined that the relay is fused, the control unit 270 may display the fusion of the relay through the LED or notify the fusion of the relay through the add-on device 400 or directly to the terminal device 300. Also, the control unit 270 may stop a charging function before the relay fusion is resolved.

According to an embodiment, the above-described method can be embodied as processor readable codes on a program recorded medium. Examples of the processor readable recording medium include read-only memory (ROM), random-access memory (RAM), CD-ROMs, magnetic tapes, floppy disks, and optical data storage devices, and carrier waves (such as data transmission through the Internet).

Not only the configurations and methods of the embodiments are limitedly applied to the above-described mobile terminal, but also the whole embodiments or parts of the embodiments can be selectively combined and configured to allow various modifications to be conducted.

The cable installment type charging control device according to the embodiments may easily determine whether the power relay is fused.

Also, since the device determines whether the power relay is fused in a state where the power relay is controlled to be turned off, power transmission to the EV-side may be prevented when it is determined whether the relay is fused.

Also, since the device determines whether the power relay is fused in a state where the power relay is controlled to be turned off, probability of electric shock may be reduced.

Also, it may be determined whether each of the plurality of power relays is fused.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cable installment type charging control device for charging an electric vehicle (EV) by using power of a grid-side, the cable installment type charging control device comprising:
    a first relay delivering power of the grid-side to an EV-side;
    a second relay delivering power of the grid-side to the EV-side;
    an AC-DC converter generating a driving voltage by using AC power between the grid-side of the first relay and the grid-side of the second relay;
    a first sub fusion detecting unit comprising:
    a third relay having one end connected to the EV-side of the first relay;
    a first resistor having one end connected to the third relay;
    a first pull-up resistor having one end supplied by the driving voltage; and
    a first photo coupler including a light emitting diode connected between another end of the first resistor and one end of the second relay and a transistor connected between another end of the first pull-up resistor and a ground,
    wherein the transistor is turned on when the light emitting diode is emitting light, and wherein the first sub fusion detecting unit outputs a logic high signal or a logic low signal corresponding to the driving voltage according to whether a current flows through the light emitting diode; and
    wherein the cable installment type charging control device further comprises a control unit configured to:
    turn off the third relay in a state where the first and second relays are turned off; and
    determine that the first relay is not fused on when the logic low signal is input and that the first relay is fused on when the logic high signal is input.

2. The cable installment type charging control device according to claim 1, further comprising a second sub fusion detecting unit for detecting whether the second relay is fused through an EV-side terminal of the second relay and a grid-side terminal of the first relay.

3. The cable installment type charging control device according to claim 2, wherein the second sub fusion detecting unit comprises:
    a fourth relay having one end connected to the grid-side of the first relay;
    a second resistor having one end connected to another end of the fourth relay;
    a second pull-up resistor having one end supplied by the driving voltage; and
    a second photo coupler including a light emitting diode connected between another end of the second resistor and the EV-side terminal of the second relay and a transistor connected between another end of the second pull-up resistor and a ground,
    wherein the transistor is turned on when the light emitting diode is emitting light,
    wherein the second sub fusion detecting unit outputs a logic high signal or a logic low signal corresponding to the driving voltage according to whether a current flows through the light emitting diode.

4. The cable installment type charging control device according to claim 3, wherein the control unit is configured to:
    turn on the fourth relay in a state where the first and second relays are turned off; and determine that the second relay is not fused on when the logic low signal is input, and that the second relay is fused on when the logic high signal is input.

5. The cable installment type charging control device according to claim 1, further comprising a communication unit for communicating with an add-on communication device attached to the cable installment type charging control device,
wherein the control unit notifies whether the first relay is fused to a terminal device through the communication unit via the add-n communication device.

6. The cable installment type charging control device according to claim 1, wherein the control unit stops a charging function before the fusion of the first relay is resolved.

7. A method of operating a cable installment type charging control device for charging an electric vehicle (EV) by using power of a grid-side, the method comprising:
delivering power of the grid-side to an EV-side through first and second relays; and
detecting whether the first relay is fused through an EV-side terminal of the first relay and a grid-side terminal of the second relay and through a third relay, a first resistor, and a first photo coupler which are connected to each other in series,
generating a driving voltage via an AC-DC converter by using AC power between the grid-side of the first relay and the grid-side of the second relay, wherein the detecting whether the first relay is fused on is performed via:
a first sub fusion detecting unit comprising:
the third relay having one end connected to the EV-side of the first relay;
the first resistor having one end connected to the third relay;
a first pull-up resistor having one end supplied by the driving voltage; and
the first photo coupler including a light emitting diode connected between another end of the first resistor and one end of the second relay and a transistor connected between another end of the first pull-up resistor and a ground,
wherein the transistor is turned on when the light emitting diode is emitting light, and wherein the first sub fusion detecting unit outputs a logic high signal or a logic low signal corresponding to the driving voltage according to whether a current flows through the light emitting diode, and
wherein the method further comprises:
turning off the third relay in a state where the first and second relays are turned off; and
determining that the first relay is not fused on when the logic low signal is input and that the first relay is fused on when the logic high signal is input.

* * * * *